Patented Mar. 14, 1944

2,344,090

UNITED STATES PATENT OFFICE 2,344,090

MILK-PROTEIN GEL DESSERT AND METHOD OF PRODUCING THE SAME

Louis J. Huber and Lacey H. Evans, Minneapolis, Minn., assignors to General Mills, Inc., a corporation of Delaware No Drawing. Application November 30, 1940, Serial No. 367,918

14 Claims. (Cl. 99—139)

The present invention relates to a milk-protein base gel dessert and to methods of producing the same.

The principal object of our invention is to provide a new milk-protein gel dessert having a soft, custard-like consistency and a homogeneous, smooth texture which is entirely free from lumps.

Another object of our invention is to provide a simple method for the production of milk-protein gel desserts wherein such desserts may be formed rapidly without the necessity for critical control of the conditions under which the dessert is prepared by the housewife or consumer.

A further object of our invention is to provide an efficient method for the production of a milk-protein gel dessert whereby such dessert may be formed fairly rapidly without the application of heat thereto and without the addition of proteins not present in milk.

A still further object of our invention is to provide a new milk-protein gel dessert having a suitable fruit-like acidity which serves to enhance fruit flavors that may be added thereto.

In producing certain types of milk-protein desserts such as those of the rennet type, it has been customary to set or coagulate the milk protein by the action of the rennet enzyme. This enzyme is obtained from the stomachs of calves. When added in small quantities to milk and allowed to stand, the milk is converted to a homogeneous gel. The optimum temperature of milk for rennet gel formation is 41° C. Higher or lower temperatures retard the activity of the rennet. Also, when rennet is used as the coagulating agent for milk-proteins, the latter must have a definite concentration of calcium and hydrogen ions so that a firm gel may be produced.

We have found that we can produce a new type of milk-protein gel dessert without the use of any enzyme as a coagulating agent, and that a firm, satisfactory gel may be formed by the use of a suitable powdered acid-liberating substance such as glucono delta lactone.

It is well known that casein may be precipitated from milk by the addition of a small amount of acid thereto. In this case, the casein will be obtained in the form of relatively firm, flocculent curds which are quite unsuited for use as a dessert because there is a distinct separation into two phases, curd and whey. However, if the necessary acid can be slowly liberated in the body of the milk in a uniform manner, the casein will be precipitated as a homogeneous, smooth gel. We accomplish this by the use of a lactone such as glucono delta lactone. This compound is very soluble in water, dissolving almost immediately. After going into solution, it then slowly hydrolyses during a period of minutes or hours, depending on the concentration and temperature, to yield an edible sugar acid, i. e., gluconic acid.

The lactone may be incorporated into the dessert mixture by various methods. For example, we have found that satisfactory results are obtained by adding from 2½%, by weight, to 6%, by weight, of a suitable organic-acid yielding substance such as glucono delta lactone to fresh milk. The milk containing the lactone dissolved therein is then allowed to stand for a suitable period of time, say, about 1 to 2 hours, until it forms a firm gel. The period of time required for gel-formation may be substantially reduced by the application of heat. For example, if the milk containing dissolved lactone is heated to 50° C., the gel may be formed in about 5 minutes. If desired, suitable amounts of sugar, flavoring, and coloring matter may be incorporated in the above-described gel, by the addition of these materials to the milk prior to the addition of the lactone thereto, or they may be blended with the lactone and the mixture added to the milk. The dessert may be eaten immediately after setting or preserved preferably by refrigeration until required.

If desired, the invention may be embodied in several powdered forms. For example, we may take from 10% to 20%, by weight, of a good grade of commercial, dry, powdered milk, and mix with it from 3% to 10%, by weight, of powdered glucono delta lactone. If desired, we may add to the mixture from 20% to 40%, by weight, of sugar, and suitable amounts of flavoring such as the essential oils of lime, lemon, orange, banana, etc., or such true fruit extracts as raspberry, strawberry, grape, etc., and appropriate coloring matter in the form of vegetable colors or certified coal tar dyes. This powdered mixture may then be used to form a dessert by dissolving it in water, preferably water having a temperature of from 30° C. to 50° C., and the solution is then allowed to stand until a satisfactory gel has formed. In the above example, the percentages of the various ingredients used are based on the weight of the water used.

In the above composition, we have found that favorable results may be attained by the use of edible, dry, soluble casein salts, such as sodium, ammonium, or potassium caseinates when substituted for the dry powdered milk, in the proportion of from about 3% to 10%, by weight, to the weight of the water used. If desired, sugar may be added to this composition in the proportions previously stated together with suitable amounts of color and flavoring matter. This composition may be dissolved in cold or hot water and allowed to stand to form a gel in the manner indicated above.

Instead of employing glucono delta lactone, as specified in the above examples, as the acidifying and gel-forming agent for the milk-protein ingredients, we may employ any other suitable lactone which is capable of reacting with water to gradually yield, by hydrolysis, a weak, edible, organic acid, such as delta rhamnolo lactone, delta mannono lactone, gamma galactono lactone, tetramethyl delta mannono lactone, tetramethyl delta glucono lactone, tetramethyl delta galactono lactone, trimethyl delta arabano lactone, tetramethyl gamma glucono lactone, and trimethyl gamma arabano lactone, in amounts necessary to bring the gel-forming solution to a pH of approximately 4.2.

By the term "milk proteins" as used in the specification and claims, we include the phosphoprotein in colloidal suspension in fresh milk known more commonly as casein.

While we do not desire to limit ourselves to any particular theory of operation, we believe that the lactone when added to fresh milk, or a suspension of a suitable casein salt, or a powdered milk solution, slowly combines with the water present to form an edible, organic acid which serves to lower the pH of the medium to the isoelectric point of casein. Since milk is a colloidal system composed principally of protein in colloidal suspension, the acidity produced by the hydrolysis of the lactone will reduce the stability of the casein suspension and cause its precipitation in the form of a gel. Since the acid is formed slowly and simultaneously in all parts of the solution or suspension, the gel is homogeneous.

Another function of the lactone in our improved gel dessert is to furnish the necessary acidity to the composition to thereby enhance fruit flavors which may be incorporated therein. In the preparation of the rennet types of milk desserts, the addition of the ordinary edible acids such as citric, lactic or tartaric acids to the milk, will produce an immediate clumping in the dessert and destroy its gel-forming properties. Thus the direct addition of such acids to rennet type desserts is not feasible.

Another advantage of our invention is that we produce a gel of superior eating qualities to the rennet type of milk dessert. By the methods of our invention, we produce a gel of greater coherence and stability than those of the rennet type. Our type of gel also shows a reduced tendency to exhibit syneresis.

Another advantage of our invention is that we may produce custard-like desserts without the use of egg proteins and without the use of baking temperatures.

While the invention has been described in detail with specific examples, such examples are illustrative and are not given as limitations, since other modifications within the spirit and scope of the invention will be apparent to those skilled in the art. Hence, the invention is to be understood as limited only as indicated, in the appended claims, in which the intent is to set forth all the novelty over the prior art.

We claim as our invention:

1. As a composition for producing a milk-protein gel dessert, 10 to 20 parts, by weight, of dry, powdered milk, and from 3 to 10 parts, by weight, of a lactone selected from a group consisting of glucono delta lactone, delta rhamnolo lactone, delta mannono lactone, gamma galactono lactone, tetramethyl delta mannono lactone, tetramethyl delta glucono lactone, tetramethyl delta galactono lactone, trimethyl delta arabano lactone, tetramethyl gamma glucono lactone, and trimethyl gamma arabano lactone.

2. As a composition for producing a milk-protein gel dessert, 10 to 20 parts, by weight, of dry, powdered milk, 20 to 40 parts, by weight, of sugar, suitable amounts of coloring and flavoring materials, and from 3 to 10 parts, by weight, of a lactone selected from a group consisting of glucono delta lactone, delta rhamnolo lactone, delta mannono lactone, gamma galactono lactone, tetramethyl delta mannono lactone, tetramethyl delta glucono lactone, tetramethyl delta galactono lactone, trimethyl delta arabano lactone, tetramethyl gamma glucono lactone, and trimethyl gamma arabano lactone.

3. As a composition for producing a milk-protein gel dessert, from 3 to 10 parts, by weight, of a powdered, soluble casein salt selected from a group consisting of sodium, ammonium, or potassium caseinates, 20 to 40 parts, by weight, of sugar, suitable amounts of coloring and flavoring materials, and from 3 to 10 parts, by weight, of a lactone which is capable of reacting with water to gradually yield, by hydrolysis, a weak edible, organic acid, capable of precipitating the casein salt as a homogeneous gel.

4. As a composition for producing a milk-protein gel dessert, from 3 to 10 parts, by weight, of casein, 20 to 40 parts, by weight, of sugar, suitable amounts of coloring and flavoring materials, and from 3 to 10 parts, by weight, of a lactone selected from a group consisting of glucono delta lactone, delta rhamnolo lactone, delta mannono lactone, gamma galactono lactone, tetramethyl delta mannono lactone, tetramethyl delta glucono lactone, tetramethyl delta galactono lactone, trimethyl delta arabano lactone, tetramethyl gamma glucono lactone, and trimethyl gamma arabano lactone.

5. As a composition for producing a milk-protein gel dessert from an aqueous suspension of milk protein, approximately 3 to 10 parts, by weight, of a lactone which is capable of reacting with water to gradually yield by hydrolysis a weak edible organic acid, admixed with suitable amounts of flavoring material and from approximately 20 to 40 parts, by weight, of sugar.

6. The method of making a milk-protein gel dessert which comprises adding to liquid milk from 3% to 10%, by weight, of a lactone which is capable of reacting with the milk to gradually yield, by hydrolysis, a weak, edible, organic acid, thereby precipitating the casein of the milk in the form of a homogeneous gel.

7. The method of making a milk-protein gel dessert which comprises adding to water a powdered mixture consisting of from 3 to 10 parts, by weight, of a casein salt, from 3 to 10 parts, by weight, of a lactone which is capable of reacting with water to gradually yield by hydrolysis a weak edible organic acid, from 20 to 40 parts, by weight, of sugar, and suitable amounts of flavoring and coloring matter, and permitting the suspension to stand until the lactone has reacted with the casein salt to form a homogeneous gel.

8. In the method of making a milk-protein gel dessert, the step which comprises reacting a lactone which is capable of reacting with water to gradually yield by hydrolysis a weak edible organic acid with an aqueous suspension containing a milk-protein thereby forming a homogeneous gel.

9. The method of making a milk-protein gel dessert from powdered milk which comprises adding to water a powdered mixture consisting of 10 to 20 parts of powdered milk, from 3 to 10 parts of a lactone which is capable of reacting with water to gradually yield by hydrolysis a weak edible organic acid, from 20 to 40 parts of sugar, and a suitable amount of flavoring material, and permitting the solution thus formed to stand until the lactone has reacted with the milk protein to form a homogeneous gel.

10. A composition for producing a milk protein gel dessert comprising a material containing milk protein and a lactone capable of precipitating said milk protein from aqueous suspension.

11. A composition for producing a milk protein gel dessert comprising a material containing milk protein and glucono delta lactone.

12. A method of making a milk protein gel dessert which comprises reacting glucono delta lactone with an aqueous suspension containing milk protein thereby forming a homogeneous gel.

13. A composition for producing a milk protein gel dessert from an aqueous suspension of milk protein comprising glucono delta lactone, sugar and flavoring material.

14. A milk protein gel dessert comprising a smooth homogeneous milk protein gel, substantially free from syneresis, having a pH substantially that of the iso-electric point of casein, containing an organic acid resulting from the hydrolysis of a lactone containing fruit flavor, said fruit flavor being enhanced by the acidity of the gel.

LOUIS J. HUBER.
LACEY H. EVANS.